Aug. 5, 1930.   P. K. SAUNDERS   1,772,292

VALVE, COCK, OR THE LIKE

Filed June 7, 1928

Witness:
Arthur Thompson

Inventor:
Philip Keith Saunders

Patented Aug. 5, 1930

1,772,292

UNITED STATES PATENT OFFICE

PHILIP KEITH SAUNDERS, OF BENONI, TRANSVAAL, SOUTH AFRICA

VALVE, COCK, OR THE LIKE

Application filed June 7, 1928, Serial No. 283,603, and in Union of South Africa August 5, 1927.

This invention relates to valves, cocks or the like for controlling the flow of fluids through pipes or other conduits.

In plug cocks, gate valves, globe valves, and the like, as now commonly constructed, certain of the operative parts, which are subject to sliding friction, work in the fluid which passes through the pipe or pipe line. Consequently, as these parts are not readily accessible, efficient lubrication thereof is rendered practically impossible. Furthermore, such working or operative parts, in the case of valves used with corrosive fluids, or liquids carrying or containing gritty or hard solid matter, are subject to corrosion and/or abrasion. As a result of such wear and tear of the working parts of such valves, said parts have to be renewed frequently. As the efficient working of the valves, et cetera, above referred to depends on the accurate and tight fitting of the working parts, leakages and losses of the fluid into the atmosphere, as well as along the pipe or pipe line, occur when said parts become worn or corroded, even though the valve is supposed to be closed.

Now one object of my present invention is to design a simple and efficient valve or cock which has no moving metal parts exposed to the abrasive or erosive and/or corrosive action of the fluid in its passage through the valve or cock.

Another object is to construct the valve, et cetera, in such a way that the part or parts which are subject to the greatest amount of wear and tear can be easily and quickly renewed at small cost, and, if desired, without the necessity for removing the valve from the pipe line in which it is placed.

The design of the improved cock is also such that the possibility or likelihood of its disorganization is reduced to a minimum, it being of simple and strong construction and not liable readily to get out of order.

According to this invention the body or main part of the valve, et cetera, is constructed interiorly to provide a passage leading from the inlet (or outlet), the inner end of the part providing said passage forming or carrying a seating, and said passage communicating beyond the seating with another passage leading to the outlet (or inlet), and above or beyond said seating is arranged a flexible diaphragm which is adapted to be forced on to the seating in order to close the valve, and to move or be moved in the opposite direction to open the valve.

The diaphragm may be secured in position above or beyond the seating by arranging and securing it between the body of the valve and a cover fixed thereto, and the means for forcing the diaphragm on to the seating to close the valve is housed in or carried by the cover at the side of the diaphragm remote from the seating. The effect of this construction is to place the metal working parts completely outside the fluid passage through the valve body, or the fluid-containing portion of the valve, thereby protecting the said parts from abrasion, erosion, or corrosion, and permitting of efficient lubrication of the said parts. It follows, owing to this construction, that the efficient operation of the improved valve is not dependent upon accurately fitting, more or less complex, metal parts.

The invention will be more fully explained with the aid of the attached sheet of drawings, wherein a practical embodiment of the same is shown. In the drawings, Fig. 1 is a sectional elevation of the improved valve, showing the same fully open.

Figure 1:
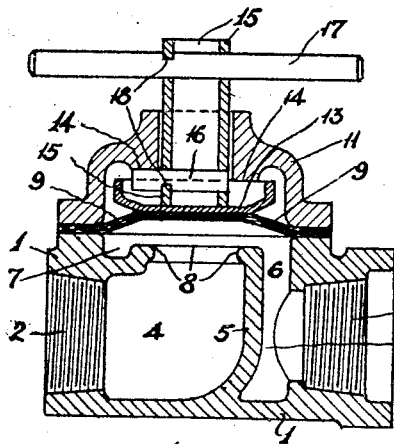

As illustrated in the drawings, the body or main portion 1 of the valve, et cetera, is constructed at the one side with an inlet 2, and at the opposite side with an outlet 3.

The inlet 2 communicates with an upwardly directed internal passage 4, provided by an elbow-shaped part or bend 5, which is shown constructed integral with the body 1, and which, when the valve is open, is in communication, through an outer curved space or passage 6, with the outlet 3. The fluid will flow from the inlet 2, through internal passage 4, into and through the space or passage 6, to the outlet 3, or vice versa, i. e., from the side 3, which will then serve as the inlet, through the space or passage 6 and passage 4, to the side 2, which will then serve as the outlet. The outlet space or passage 6 communicates with a curved recess 7, formed in the body around the upper end of the bend 5, at the inlet side of the body. The upper end of the bend 5 terminates in a circular orifice 8 and serves as the seating for the diaphragm 9 which constitutes the valve proper.

Figure 9:
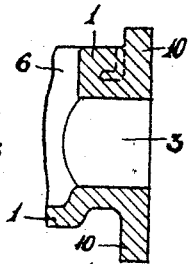
Fig. 9 is a fragmentary view illustrating a modified construction for the inlet and outlet of the valve body.
Figure 4:
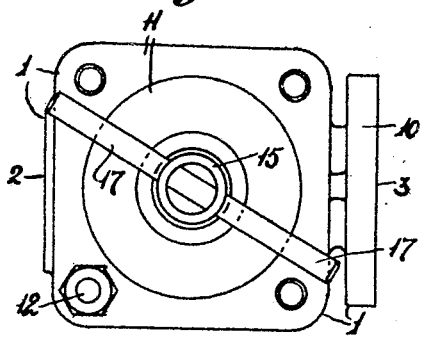
Fig. 4 is a plan of the valve.

In Fig. 1 the inlet 2 and outlet 3 are shown provided with the usual gas or other suitable internal screw-threads, for taking or receiving the end of the pipe or pipe fitting; or as shown in Fig. 9, and in the right-hand half of Fig. 4, the inlet and outlet sides of the body 1 may be constructed with flanges 10 for making the necessary connections; or such connections may be made in any other suitable and preferred manner.

Figure 2:
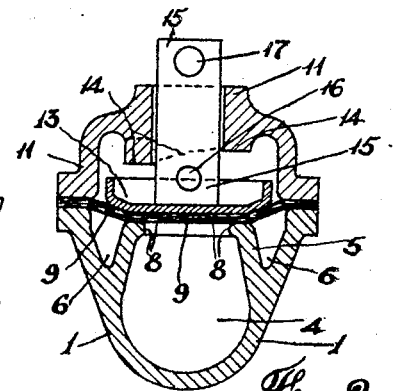
Fig. 2 is a sectional elevation, at right angles to Fig. 1, showing the valve closed.
Figure 5:
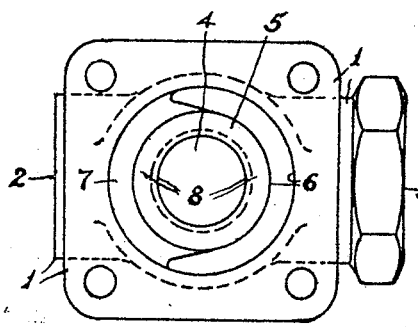
Fig. 5 is a plan of the valve body, with the cover removed.
Figure 8:
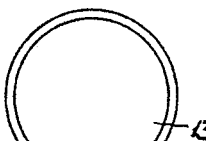
Fig. 8 is a plan view of a pad or disc, which forms part of the closing means and co-operates directly with the diaphragm.
Figure 3:
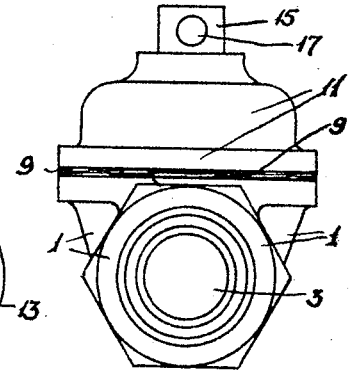
Fig. 3 is an end elevation of the valve.

The body 1 is provided with a cap or cover 11 which is shown bolted thereto. Between the cap or cover 11 and the top of the body 1 is arranged the diaphragm 9 of rubber, leather or other suitable soft or flexible material. The cap or cover 11, on the underside, is recessed or shaped so as to allow of a certain amount of upward movement of the diaphragm 9 in a direction away from the valve seating 8—see Fig. 1—which upward movement of the diaphragm 9 takes place in the opening of the valve. When pressed down tightly on to its seating 8—as shown in Fig. 2—the diaphragm 9 closes the valve and thus prevents the flow of fluid through the valve.

The diaphragm 9 is shown secured between the cap or cover 11 and the valve body 1 by the bolts 12 which serve to bolt said cap or cover 11 to the body 1. The inner edges of the cap or cover 11, as well as the edges of the seating 8, which come into contact with the diaphragm 9, are rounded so as not to cut or otherwise damage the flexible diaphragm 9.

The means for closing the valve, by forcing the diaphragm 9 down on to the seating 8, is shown including the circular metal pad or disc 13, which rests upon or engages with the diaphragm 9, and is adapted to move upwardly and downwardly in the cap or cover 11 above the diaphragm 9. The pad or disc 13 is shaped so as to present no sharp edges to the surface of the diaphragm 9, and it is shown of dished formation to give it the requisite rigidity.

Figure 7:
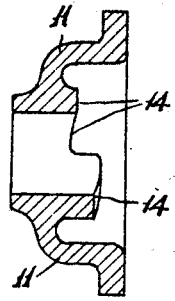
Fig. 7 is a sectional elevation of the cover.
Figure 6:
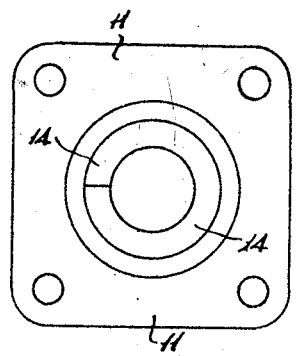
Fig. 6 is a plan of the cover detached, as seen from the underside.

The pad or disc 13 may be pressed or forced downwards in order to force the diaphragm 9 on to its seat to close the valve by any suitable means. The means are preferably such as will allow the fluid pressure acting on the diaphragm 9 automatically to open the valve when the pressure of said means on the pad or disc 13 is released. The particular means shown for operating the pad or disc 13 consists in fashioning the cap or cover 11 on the inside with a circular cam or wedge surface 14—see more particularly Fig. 7—and in rotatably arranging a tubular piece 15 in the top of the cap or cover 11, said piece 15, at its inner end, contacting with the top of the pad or disc 13 and carrying a pin 16 which engages with the circular cam or wedge surface 14, so that on the rotation of the piece 15 in one direction, the diaphragm 9 is forced on to its seating 8 by the pad or disc 13, and the valve closed, while, on the rotation of the piece 15 in the reverse direction, the diaphragm 9, pad or disc 13, and the movable actuating parts above it, are automatically raised by the fluid pressure acting on the diaphragm 9, and the valve opened.

In the upper end of the tubular piece 15 a handle 17, shown in the form of a pin, is secured, for rotating it. As illustrated, the pin 16 and handle 17 may be secured in holes in the piece 15 by forming transverse grooves or notches 18 in the pin 16 and handle 17 and, after placing them in position in the piece 15, applying pressure to the ends of said piece 15 to press portions of the latter into said grooves 18.

The pad or disc 13 is preferably made of such a size and so constructed that it covers and supports the greater portion of that part of the flexible diaphragm 9 which works between the cover 11 and the seating 8, so that whether the valve is open or closed, the diaphragm 9 is put under little tension by the fluid pressure in the valve.

Instead of providing the seating 8 around the orifice of the passage 4 in the bend 5, a detachable and renewable ring or part, screwed or otherwise suitably secured to the upper end of the bend 5, may be constructed to provide the seating.

As will be readily understood from the drawings, the renewal of the rubber, leather or other flexible diaphragm can be effected by merely removing the cap or cover 11, and without taking the valve out of the pipe line.

What I claim as my invention and desire to protect by Letters Patent is:—

1. A valve, cock or the like, including a body portion constructed interiorly with a passage which forms a valve seating, and with a further passage beyond said seating, a cover fixed to the body, a flexible diaphragm secured between the body and cover and adapted to co-operate with the seating to close the valve, and means for operating said diaphragm, including a pad housed within the cover and arranged on the side of the diaphragm remote from the seating, for pressing the diaphragm on to the seating, a circular cam surface provided on the cover, and means engaging with said cam surface for operating the diaphragm through the pad, as set forth.

2. A valve, cock or the like, including a body portion constructed interiorly with a passage which forms a valve seating, and with a further passage beyond said seating, a cover fixed to the body, a flexible diaphragm secured between the body and cover and adapted to co-operate with the seating to close the valve, and means for operating said diaphragm, including a pad housed within the cover and arranged on the side of the diapragm remote from the seating, for pressing the diaphragm on to the seating, a circular cam surface provided on the cover, and a part which passes through the cover provided with a handle at the outside, and, at the inside of the cover, engaging with the pad and carrying a pin which engages with the cam surface, as set forth.

In testimony whereof I have signed my name to this specification.

PHILIP KEITH SAUNDERS.